Patented May 10, 1938

2,116,913

UNITED STATES PATENT OFFICE 2,116,913

HEAVY METAL AZOMETHINE DIARYLENE DIHYDROXYLATES

Karl Schmidt, Cologne-Mulheim, and Ottmar Wahl, Leverkusen, Germany, assignors to General Aniline Works, Inc., New York, N. Y., a corporation of Delaware No Drawing. Application September 16, 1936, Serial No. 101,089. In Germany October 12, 1935

3 Claims. (Cl. 260—11)

The present invention relates to new pigment dyestuffs, more particularly it relates to heavy metal complex compounds of ortho-ortho'-dihydroxy-azomethine compounds.

Our new dyestuffs are obtainable by reacting upon an aromatic ortho-hydroxyamino compound with an ortho-hydroxy-carbonyl compound of the general formula:

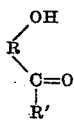

in which R means an aromatic radical and R' stands for hydrogen or an aromatic radical, such as alkyl or aryl, in the presence of a heavy metal salt in water or organic solvents or in a mixture of the same, favourably at elevated temperature.

For the purpose of the invention there come into consideration aromatic ortho-hydroxyamino compounds, such as of the benzene or naphthalene series, while as ortho-hydroxycarbonyl compounds of the above mentioned general formula there may be mentioned by way of example ortho-hydroxyaldehydes of the benzene or naphthalene series and aryl-alkyl-ketones or diaryl-ketones respectively bearing in ortho-position to the carbonyl group a hydroxy group. It is self-understood that the ortho-hydroxy-compounds or hydroxycarbonyl compounds employed may bear in the nucleus or nuclei respectively further substituents, such as the hydroxy group, halogen, alkyl, alkoxy, the nitro group, the amino group, a substituted amino group, while acid salt forming groups, such as the sulfonic acid group and the carboxylic acid group, are excluded. As heavy metals, the salts of which come into consideration, there may be mentioned by way of example salts of iron, nickel, cobalt, copper, zinc, lead, chromium, cadmium, titanium, zirconium etc.

The process is carried out by dissolving the ortho-hydroxyamino compound and the ortho-hydroxycarbonyl compound in water or suitable organic solvents and adding thereto the solution of a heavy metal salt, the reaction being performed at temperatures between room temperature and the boiling point, it being favourable, however, to work at elevated temperatures. The formation of the new pigments proceeds very quickly, and according to our present knowledge (in case of the use of salts of bivalent metals) the reaction proceeds according to the following schemes:

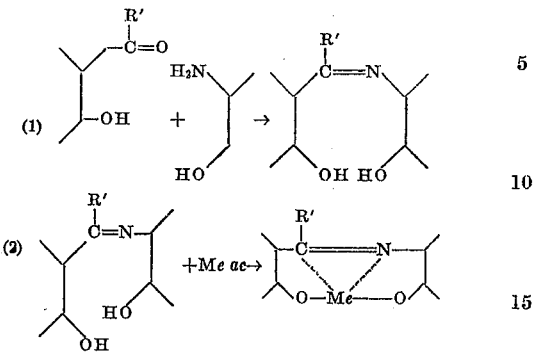

In the said schemes R' means an organic radical, Me a bivalent metallic radical and ac the radical of an acid.

The products obtainable, represent, depending upon the specific components used in their manufacture, various colored substances, being insoluble in water and the usual organic solvents, such as alcohol, hydrocarbons, but being soluble in pyridine. They exert a high coloring capacity and also a remarkable purity of the shade, and can be used for color lakes.

Example 1

9.17 gs. of zinc acetate $(Zn(C_2H_3O_2)_2+3H_2O)$ are heated to 80° C. in 75 ccs. of alcohol and 75 ccs. of water. By the addition of 6.1 gs. of ortho-hydroxybenzaldehyde a clear solution, which is weak yellow colored, is obtained. Then quickly a hot solution of 5.45 gs. of ortho-aminophenol in 50 ccs. of alcohol and 50 ccs. of water is added. Immediately a greenish yellow precipitate separates, which, after short heating of the reaction mixture, is filtered off with suction, washed with aqueous alcohol and dried at about 80° C. In this manner a greenish yellow pigment is obtained, which shows, when used as a lake dyestuff, a pure shade and a good fastness to light.

The dyestuff corresponds to the following formula:

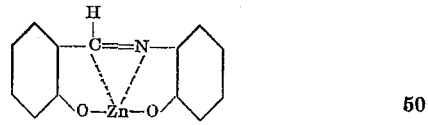

Example 2

On replacing the ortho-hydroxybenzaldehyde employed in Example 1 by the equivalent quantity of 2-hydroxy-1-naphthaldehyde, and the ortho-aminophenol by the equivalent quantity of 2.3-aminonaphthol, an orange pigment dyestuff is obtained of a remarkable purity of the shade and a good fastness to spirit and oil.

The dyestuff corresponds to the formula:

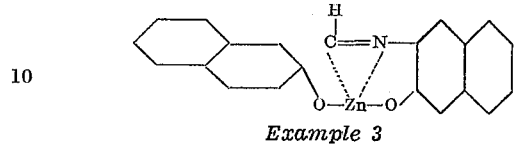

*Example 3*

On replacing the ortho-aminophenol employed in Example 1 by the equivalent quantity of the para-amino-meta-hydroxy-diethyl-aniline of the formula:

an orange-yellow colored pigment dyestuff is obtained of the greatest possible strength.

The dyestuff corresponds to the following formula:

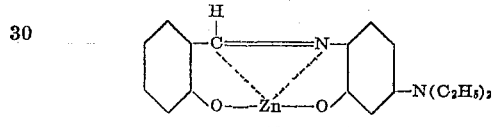

*Example 4*

When working according to the directions given in Example 1 using thereby as components instead of the ortho-hydroxybenzaldehyde the 5-chloro-2-hydroxybenzaldehyde, and instead of the ortho-aminophenol the 3-amino-4-cresol of the formula:

there is obtained a pure yellow pigment dyestuff of a very good fastness to light.

The dyestuff corresponds to the following formula:

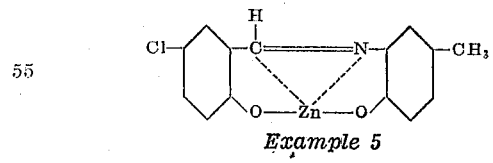

*Example 5*

To a boiling solution of 6.1 gs. of ortho-hydroxybenzaldehyde in 120 ccs. of alcohol there is added a solution of 16.25 gs. of lead acetate $$(Pb(C_2H_3O_2)_2 + 3H_2O)$$

in 40 ccs. of water. A clear solution, which is weak yellow colored, is obtained, and to this solution another one of 5.45 gs. of ortho-aminophenol in 75 ccs. of alcohol is added. Immediately an intensely yellowish orange colored precipitate separates; then the whole is further heated for a short time to boiling, the precipitate is filtered off with suction, washed with alcohol and water, and dried at 80° C. The yellowish orange organic lead compound obtained in this manner crystallizes in yellow needles and is a pigment entirely insoluble in water.

The dyestuff corresponds to the following formula:

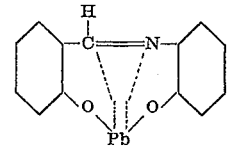

*Example 6*

On replacing the ortho-aminophenol employed in Example 5 by the equivalent quantity of 5-nitro-2-aminophenol, a red pigment dyestuff is obtained, which likewise crystallizes in needles.

The dyestuff corresponds to the following formula:

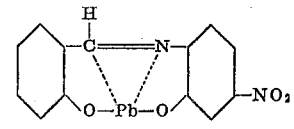

*Example 7*

On replacing the zinc acetate employed in Example 1 by an equivalent quantity of potassium titanoxalate, and on substituting the ortho-aminophenol by an equivalent quantity of 5-nitro-2-aminophenol, a reddish brown pigment dyestuff of a remarkable fastness to light is obtained.

The dyestuff corresponds to the following probable formula:

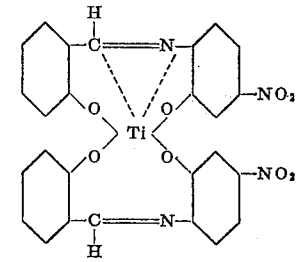

*Example 8*

16.0 gs. of zirconium oxychloride $$(ZrOCl_2 + 8H_2O)$$

are dissolved in 300 ccs. of alcohol of 50% strength. On adding 6.1 gs. of ortho-hydroxybenzaldehyde, by heating up to 80° C., a clear solution, which is weak yellow colored, is obtained, to which solution quickly, while stirring, a hot solution of 5.45 gs. of ortho-aminophenol in 150 ccs. of alcohol of 50% strength and 12 ccs. of pyridine is added. After a short time, there begins the separation of a bright yellowish orange colored precipitate, which is filtered with suction, washed with 300 ccs. of hot alcohol of 50% strength, and dried at about 80° C. The pigment dyestuff obtained in this manner is orange colored.

The dyestuff corresponds to the following probable formula:

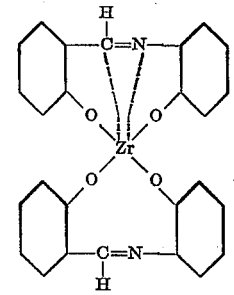

Example 9

17.4 gs. of thorium nitrate (Th(NO₃)₄) are dissolved in 160 ccs. of alcohol of 25% strength, and to this solution there are added 6.1 gs. of ortho-hydroxybenzaldehyde. After short heating on the boiling water bath, with change of the color to yellow, the aldehyde dissolves. Then quickly a hot solution of 5.45 gs. of ortho-aminophenol in 150 ccs. of alcohol of 25% strength and 15 ccs. of pyridine is added thereto. Immediately there separates an intensively bright orange colored precipitate, which, after short heating, is filtered with suction and washed with 300 ccs. of alcohol of 25% strength. The pigment dyestuff obtained in this manner is orange colored.

The dyestuff corresponds to the following probable formula:

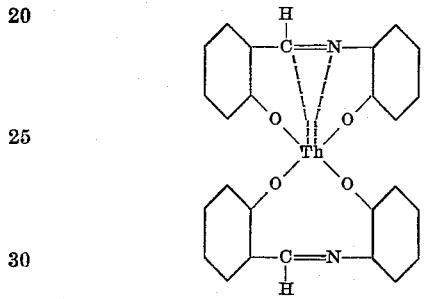

Example 10

6.1 gs. of ortho-hydroxybenzaldehyde and 5.45 gs. of ortho-aminophenol are refluxed in 300 ccs. of alcohol of 50% strength. While stirring there is added a hot solution of 8.08 gs. of copper acetate in 200 ccs. of alcohol of 50% strength. A greyish-green precipitate separates, which, after boiling for one hour, is filtered with suction, washed with alcohol of 50% strength and dried. The olive colored graphic print of this pigment dyestuff distinguishes by a remarkable fastness to light.

The dyestuff corresponds to the following formula:

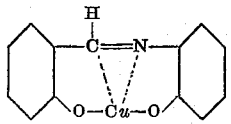

We claim:

1. As new products heavy metal complex compounds of ortho-ortho'-dihydroxy-azomethine compounds of the following formula:

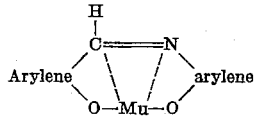

wherein the arylenes represent members of the group consisting of radicals of the benzene and naphthalene series bound by two adjacent carbon atoms and being free from acid salt forming groups, and Me stands for a bivalent heavy metal atom, being valuable pigments.

2. As new products heavy metal complex compounds of ortho-ortho'-dihydroxy-azomethine compounds of the following formula:

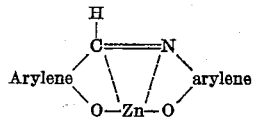

wherein the arylenes represent members of the group consisting of radicals of the benzene and naphthalene series bound by two adjacent carbon atoms and being free from acid salt forming groups, being valuable pigments.

3. The dyestuff of the following formula:

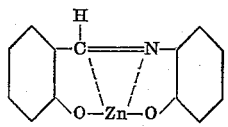

being a greenish yellow pigment of good fastness to light.

KARL SCHMIDT.
OTTMAR WAHL.